(12) United States Patent
Hojaji et al.

(10) Patent No.: US 7,311,965 B2
(45) Date of Patent: *Dec. 25, 2007

(54) STRONG, HIGH DENSITY FOAM GLASS TILE HAVING A SMALL PORE SIZE

(75) Inventors: Hamid Hojaji, Claremont, CA (US); Pedro M. Buarque de Macedo, 6100 Highboro Dr., Bethesda, MD (US) 20817

(73) Assignee: Pedro M. Buarque de Macedo, Bethesda, MD (US)

( * ) Notice: Subject to any disclaimer, the term of this patent is extended or adjusted under 35 U.S.C. 154(b) by 278 days.

This patent is subject to a terminal disclaimer.

(21) Appl. No.: 10/625,071

(22) Filed: Jul. 22, 2003

(65) Prior Publication Data

US 2005/0019542 A1   Jan. 27, 2005

(51) Int. Cl.
*E04B 1/98* (2006.01)
(52) U.S. Cl. .................. 428/318.8; 428/49; 428/316.6; 428/319.1; 501/80; 501/84; 51/167.1
(58) Field of Classification Search .................. 428/49, 428/310.5, 312.2, 312.6, 314.4, 314.8, 316.6, 428/316.8, 319.1, 318.8, 306.6, 307.3, 307.7; 501/80, 84, 85, 155, 11, 32; 264/43, 44; 156/89.11–89.14, 87.24

See application file for complete search history.

(56) References Cited

U.S. PATENT DOCUMENTS

| | | | |
|---|---|---|---|
| 2,281,524 A | 4/1942 | Meyers | |
| 2,466,613 A | 4/1949 | Richardson | |
| 2,620,597 A | 12/1952 | Ford | |
| 2,758,937 A | 8/1956 | Ford | |
| 2,991,591 A | 7/1961 | Gabor et al. | |
| 3,056,184 A | 10/1962 | Blaha | |
| 3,124,637 A | 3/1964 | Heitzer | |
| 3,292,316 A | 12/1966 | Zeinetz | |
| 3,321,414 A | 5/1967 | Sieli | |
| 3,325,341 A | 6/1967 | Shannon | |
| 3,430,397 A | 3/1969 | Ellis | |
| 3,459,565 A | 8/1969 | Jones et al. | |
| 3,537,220 A | 11/1970 | Ellis | |
| 3,592,619 A | 7/1971 | Elmer et al. | |
| 3,614,967 A | 10/1971 | Royston | |
| 3,674,585 A | 7/1972 | Windecker | |
| 3,848,335 A | 11/1974 | Bergersen | |
| 3,951,632 A | 4/1976 | Seki et al. | |
| 3,959,541 A | 5/1976 | King et al. | |
| 3,979,217 A | 9/1976 | Sutton | |
| 3,986,311 A | 10/1976 | Muhe et al. | |
| 4,024,309 A | 5/1977 | Pender | |
| 4,058,943 A | 11/1977 | Sturgil | |
| 4,119,422 A | 10/1978 | Rostoker | |
| 4,119,583 A * | 10/1978 | Filip et al. .................. 521/103 |
| 4,124,365 A | 11/1978 | Williams et al. | |
| 4,178,162 A | 12/1979 | Shono et al. | |
| 4,198,224 A | 4/1980 | Kirkpatrick | |
| 4,259,118 A | 3/1981 | Sack | |
| 4,283,457 A | 8/1981 | Kolsky et al. | |
| 4,324,037 A | 4/1982 | Grady, II | |
| 4,332,907 A | 6/1982 | Vieli | |
| 4,332,908 A | 6/1982 | Vieli | |
| 4,347,326 A | 8/1982 | Iwami et al. | |
| 4,424,280 A | 1/1984 | Malric | |
| 4,430,108 A | 2/1984 | Hojaji et al. | |
| 4,440,296 A | 4/1984 | Howe et al. | |
| 4,450,656 A | 5/1984 | Lagendijk | |
| 4,571,321 A | 2/1986 | Kijowski et al. | |
| 4,595,710 A * | 6/1986 | Albertelli et al. ............ 521/100 |
| 4,623,585 A | 11/1986 | Linton et al. | |
| 4,628,652 A | 12/1986 | Wefels | |
| 4,694,622 A | 9/1987 | Richard | |
| 4,710,415 A | 12/1987 | Slosberg et al. | |
| 4,758,538 A | 7/1988 | Satoh et al. | |
| 4,798,758 A | 1/1989 | Nagano et al. | |
| 4,833,015 A | 5/1989 | Furuuchi et al. | |
| 4,875,314 A | 10/1989 | Boilen | |
| 4,879,159 A | 11/1989 | Furuuchi | |
| 4,903,446 A | 2/1990 | Richards et al. | |
| 4,953,332 A | 9/1990 | Galloway | |
| 4,987,028 A | 1/1991 | Kandachi et al. | |
| 4,990,398 A | 2/1991 | Fukumoto et al. | |
| 4,992,321 A | 2/1991 | Kandachi et al. | |
| 5,069,960 A * | 12/1991 | Fukumoto et al. ........ 428/310.5 |
| 5,151,228 A | 9/1992 | Vahlbrauk | |
| 5,188,649 A | 2/1993 | Macedo et al. | |
| 5,231,811 A | 8/1993 | Andrepont et al. | |

(Continued)

OTHER PUBLICATIONS

Mission Area: Structural Blast Mitigation.
Co-pending U.S. Appl. No. 10/076,971, filed Feb. 15, 2002.

*Primary Examiner*—Jeanette Chapman
(74) *Attorney, Agent, or Firm*—Amster, Rothstein & Ebenstein LLP

(57) ABSTRACT

A strong, high density foam glass tile having a small pore size which can be used as a facade on both exterior and interior building walls. The foam glass tile of the present invention is strong enough that it can also be used as a structural member for a building. The foam glass tiles are very strong, and have a compression strength of 6000 psi (lb./sq. in.) or greater, and more particularly of 8000 lb./sq. in. or greater, and even more particularly of 10,000 lb./sq. in. or greater, and even more particularly of 12,000 lb./sq. in. or greater, and even more particularly of 14,000 lb./sq. in. or greater. These foam glass tiles will absorb more energy from an explosion, withstand higher heat and wind loading and other mechanical forces. The tiles of the present invention may have an average pore size of 1.0 mm or less, and preferably 0.7 mm or less, and more preferably 0.6 mm or less, and even more preferably 0.5 mm or less, and even more preferably 0.4 mm or less, and even more preferably 0.3 mm or less.

53 Claims, No Drawings

U.S. PATENT DOCUMENTS

| | | | |
|---|---|---|---|
| 5,451,465 | A | 9/1995 | Garrioch |
| 5,476,692 | A | 12/1995 | Ellis et al. |
| 5,514,198 | A | 5/1996 | Bayle et al. |
| 5,516,351 | A | 5/1996 | Solomon et al. |
| 5,588,977 | A * | 12/1996 | Pavlov et al. ............... 65/17.4 |
| 5,641,815 | A * | 6/1997 | Fehlmann ................. 521/154 |
| 5,763,341 | A * | 6/1998 | Pavlov et al. ................ 501/39 |
| 5,809,713 | A | 9/1998 | Ray |
| 5,821,184 | A * | 10/1998 | Haines et al. ................ 501/39 |
| 5,862,640 | A | 1/1999 | Negri |
| 6,042,905 | A | 3/2000 | Lingart et al. |
| 6,082,063 | A | 7/2000 | Shrive et al. |
| 6,133,172 | A | 10/2000 | Sevenish et al. |
| 6,174,587 | B1 | 1/2001 | Figge, Sr. |
| 6,207,236 | B1 | 3/2001 | Araki et al. |
| 6,212,840 | B1 | 4/2001 | Davidovitz |
| 6,468,613 | B1 | 10/2002 | Kitano et al. |
| 6,721,684 | B1 | 4/2004 | Saebi |
| 6,964,809 | B2 * | 11/2005 | Hojaji et al. ............. 428/318.8 |
| 6,967,051 | B1 * | 11/2005 | Augustynowicz et al. .... 428/68 |
| 2001/0018836 | A1 | 9/2001 | Schmidt et al. |
| 2003/0134920 | A1 | 7/2003 | Poisl et al. |
| 2004/0071960 | A1 | 4/2004 | Weber et al. |
| 2004/0079260 | A1 | 4/2004 | Datta et al. |
| 2004/0080063 | A1 | 4/2004 | Datta et al. |
| 2004/0081827 | A1 | 4/2004 | Datta et al. |
| 2004/0262801 | A1 | 12/2004 | Hojaji et al. |
| 2005/0016093 | A1 | 1/2005 | Buarque de Macedo |
| 2005/0019542 | A1 | 1/2005 | Hojaji et al. |

\* cited by examiner

STRONG, HIGH DENSITY FOAM GLASS TILE HAVING A SMALL PORE SIZE

FIELD OF THE INVENTION

The present invention relates generally to a building material to be used in building construction. More particularly, the present invention relates to high density foam glass tiles having a small pore size, which are strong and are to be used on both interior and exterior facades of buildings. Even more particularly, the present invention relates to high density foam glass tiles having a small pore size to be used on interior and exterior facades of buildings which enable such buildings to have a greater resistance to explosions.

BACKGROUND OF THE INVENTION

Over the past decades, there have been a significant number of terrorists attacks on government buildings owned by the United States and other countries both outside of the United States and within. For example, in 1993, terrorists exploded a car bomb inside the garage of the World Trade Center located in New York City, resulting in loss of life and significant property damage. Since then, in 1995, other extremists exploded a truck outside of the Federal Building located in Oklahoma City, Okla. also resulting in significant loss of life and property damage. In 1998, the United States embassies in Nairobi and Dar Es Salaam were also subject to terrorists attacks by car bombs, each of which resulted in significant loss of life and property damages. More recently, the tragic events at the World Trade Center in New York City and the Pentagon in Virginia has further emphasize the long felt need to develop and manufacture building materials which are able to withstand the shock wave from car bomb explosions and other similar terrorist attacks.

Traditionally, the internal and external tiling of buildings, industrial and residential areas, government and private sector, etc., is commonly made of natural and artificial construction materials, the most used materials being cement, marble and granite, as well as ceramic tiles of various kind. In addition to be decorative, the construction materials used should be functional, exhibiting the following characteristics: long durability, resistance to weather effects; resistance to corrosion; inert behavior to chemicals; thermal insulation properties; resistance to abrasion; and at the same time it should also be economical in both production and installation costs.

While the concept of using foam glass as a construction material is well known in the prior art, generally such foam glass has been used as a high temperature insulator and thus seeks to minimize its density and weight and is not suitable for absorbing sufficient energy from a shock wave from unexpected explosions or to resist an earthquake and/or wind and heat loading. The shortcomings in such conventional foam glass as relevant to this long standing problem is now described.

For example, Pittsburgh Corning Corporation ("PCC") of Pittsburgh, Pa. has developed and marketed a product known as Foam Glas® Insulation Systems, which is described in U.S. Pat. Nos. 3,959,541, 4,119,422, 4,198,224, 4,571,321 and 4,623,585. Because the focus of these developments are directed to making a foam insulating material, the Foam Glas® Insulation Systems tile commercially sold by PCC is relatively light, weighing 9.5 lb./cu. ft. Furthermore, since the purpose of this tile is to be used as thermal insulation, it lacks surface strength, and can be dented very easily. Because the Foam Glas® Insulation Systems tile is of relatively low density, e.g., 9.5 lb./cu. ft., such tiles will easily break when exerted to forces typically asserted on exterior walls to a building or other structure. Thus, such tiles are not suitable to be used as tiling for an exterior wall. Similarly, this foam, when exposed to a shock wave from an explosion will absorb very little of the shock waves energy when it implodes. A shock wave is a measure associated with explosions which is easily understood by those skilled in the art as being a pressure front resulting from an explosion.

Others have also attempted to use foam glass tiles as the outer skin-surface of buildings. For example, U.S. Pat. No. 5,069,960 discloses a thermally insulating foam glass tile that is coated with an outside surface to make a hard skin to protect the outside of a building. The tiles disclosed are fabricated in extremely small sizes, i.e., 18 cm×18 cm×6 cm, and the interior foam material which makes up the bulk of the material is generally of a low density. Significantly, there is no indication that the strength of the material disclosed is capable of absorbing sufficient energy from an explosion, and indeed the size of the disclosed tiles would not be ideally suitable for absorbing such energy. Furthermore, there is no indication that small size pores are being used.

Prior work by the inventors and others have developed methods for making foam glass tiles of a wide a variety of densities as described in U.S. Pat. No. 4,430,108 that can be used for building materials. While the techniques and methods disclosed were useful to manufacture then-standard size tiles of 4.25 in.×4.25 in.×0.25 in., this disclosure does not teach how to manufacture tiles of a larger size, for example 2 ft.×2 ft.×3 in. Likewise the tiles manufactured under these methods were relatively light, e.g., less than 10 lbs., and were not manufactured to withstand the effects of an explosion. To the contrary, these methods sought to optimize the thermal insulation properties of the material, and thus made smaller, lighter and weaker tiles.

While still others have worked on trying to make some large-size porous shaped bodies, these have been smaller in critical dimensions and of lower density than the present invention and not suitable to absorb a substantial amount of a shock wave which impacts the bodies associated with an explosion or earthquake. For example, U.S. Pat. No. 5,151,228 describes a process for manufacturing large-size porous shaped bodies of low density by swelling, in order to manufacture large-size cellular ceramic structural elements, e.g., multi-story high wall elements having a low weight. In the example, it discloses a tile 8.2 ft.×1.64 ft.×2 in., with a density of 26 lb./cu. ft. and a mass of 60 lbs. It also teaches to obtain a low density in order to optimize thermal insulation. Thus, this foam when exposed to a shock wave from an explosion or earthquake or heat or wind loading or stress of any kind will absorb very little of the shock waves energy when it implodes.

Further, others, such as Central Glass Co. Ltd., of Ube, Japan, have attempted to make foam glass using densities in the range of 0.3 to 0.6 g/cu. cm (or 18.7 to 37.4 lb./cu. ft.) as disclosed in U.S. Pat. No. 4,798,758. The '758 Patent explains that in order to make the foam glass stronger, an outer layer is also added which has a density in the range of 0.8 to 1.7 g/cu. cm and a thickness of 1.5 to 20 mm. In the examples shown, all the samples which are over 30 lbs. in weight were found to be unacceptable from a cutability and impact resistance perspective, for among other reasons that the surface had appreciable breaking and sometimes cracking, thus not providing a closed pore surface. Further, U.S. Pat. No. 4,833,015, a later patent by Central Glass Co. Ltd., explains the tensile strength perpendicular to the surface of the tile described in the '758 Patent was very poor, i.e., below 150 lb./sq. in., thus making it unsuitable for purposes of the present invention. Even after putting a third layer to improve the strength of the product as described in the '015 Patent, the best tensile strength achieved was below 200 lb./sq. in., and making it unsuitable for purposes of the present invention.

Other efforts by Central Glass Co., Ltd. attempt to make higher density glass tiles, such as U.S. Pat. No. 4,992,321. However, these tiles do not appear to be a closed pore structure and there is no indication as to their strength. Indeed, filler materials are used in an attempt to increase the strength with no reporting data. Further, the tiles disclosed were also very thin, 33 mm (or 1.3 in.).

Still others have attempted to make foam glass tiles with smaller pore size. For example, in U.S. Pat. No. 5,516,351, the relationship of pore size to thermal resistivity is shown in which the best pore size is always greater than 1.0 mm. Similarly, the density is always less than 12 lb./cu. ft. Other efforts to use small pore size and larger densities, such as U.S. Pat. Nos. 3,951,632 and 4,758,538, failed to achieve comparable strengths and does not disclose achieving a closed pore outer skin as disclosed by the present invention.

Unlike the prior art discussed above, the tiles of the present invention are designed and constructed of various materials so that such tiles have properties which are ideal for withstanding the shock wave associated with large explosions or make a building or other structure resistant to earthquakes.

Thus, while the prior art is of interest, the known methods and apparatus of the prior art present several limitations which the present invention seeks to overcome. In particular, it is an object of the present invention to provide a strong, high density foam glass tile with small average pore sizes which can be used as a building material.

It is another object of the present invention to increase from the commercially recommended density of 9.5 lb./cu. ft. to have a higher density of between 30-100 lb./cu. ft., and more particularly over 40 lb./cu. ft., and even more particularly over 60 lb./cu. ft.

It is another object of the present invention to make a foam glass tile with an average pore size of 1.0 mm or less, and more preferably of 0.6 mm or less, and even more preferably of 0.4 mm or less, and even more preferably of 0.3 mm or less.

It is a further object of the present invention to increase the weight of the foam glass tile to be greater than 30 lbs., and more particularly over 65 lbs. and even more particularly over 100 lbs.

It is a further object of the present invention to provide a strong, high density foam glass tile which can be used on the critical surfaces of buildings at high risk for terrorist attacks, in combination with cement, steel or other building materials.

It is also an object of the present invention to provide a glass foam tile that can be used in surfaces of typical buildings and has the advantage of having a rigid structure that when exposed to shock waves having blast energy, the tile can absorb a substantial portion of that blast energy. It also has the advantage of being more resistant to earthquakes and/or wind and heat loading.

These and other objects will become apparent from the foregoing description.

SUMMARY OF THE INVENTION

It has now been found that the above and related objects of the present invention are obtained in the form of a strong, high density foam glass tile having a small pore size which can be used as a facade on both exterior and interior building walls. The foam glass tile of the present invention is strong enough that it can also be used as a structural member for a building. The tile of the present invention may also have a closed pore structure. The foam glass tile can also be used with other material to form a panel or a composite. The present invention may be used on the critical surfaces of buildings at high risk for terrorist attacks, in combination with cement, steel or other building materials. The present invention may also be used in surfaces of typical buildings either alone or in combination with other materials. The present invention has the advantage of absorbing a substantial portion of a shock wave caused by an explosion. The present invention also has the advantage of being more resistant to earthquakes and/or wind and heat loading. It must be noted that the terms glass foam, foam glass, ceramic foam and foam ceramic are interchangeable in the present invention.

One embodiment of the present invention is a foam glass tile comprising a closed pore outer skin on at least one side, having a small average pore size, a large density and a high compression strength. The foam glass tiles are very strong, and have a compression strength of 6000 psi (lb./sq. in.) or greater, and more particularly of 8000 lb./sq. in. or greater, and even more particularly of 10,000 lb./sq. in. or greater, and even more particularly of 12,000 lb./sq. in. or greater, and even more particularly of 14,000 lb./sq. in. or greater. These foam glass tiles will absorb more energy from an explosion, withstand higher heat and wind loading and other mechanical forces. The closed pore outer skin may either be formed naturally or by bonding one or more secondary glass surfaces. The closed pore outer skin may have various color and texture variations which will make the tile suitable for use as an exterior or interior facade of a building or other structure. The tiles of the present invention may have an average pore size of 1.0 mm or less, and preferably 0.7 mm or less, and more preferably 0.6 mm or less, and even more preferably 0.5 mm or less, and even more preferably 0.4 mm or less, and even more preferably 0.3 mm or less. The density of the foam glass tile of the present invention is increased from the commercially recommended density of 9.5 lb./cu. ft. to have a higher density of between 30-100 lb./cu. ft., and more particularly greater than 40 lb./cu. ft., and even more particularly greater than 50 lb./cu. ft., and even more particularly greater than 60 lb./cu. ft. The weight of the foam glass tile of the present invention is over 30 lbs., and more particularly 35 lbs. or greater, and even more particularly 40 lbs. or greater, and even more particularly 50 lbs. or greater, and even more particularly 65 lbs. or greater, and even more particularly 100 lbs. or greater.

The strong, high density foam glass tile of the present invention which is capable of being used as a building material for interior and exterior building surfaces and having less seams than smaller tiles and which has a surface area of 1 ft.×1 ft. or greater, and more particularly a surface areas of 2 ft.×2 ft. or greater, and even more particularly has a surface area of 4 ft.×4 ft. or greater. More particularly, such tile may have a thickness of at least 2 in. and, more particularly, at least 3 in., and even more particularly at least 4 in.

Another embodiment of the present invention is a foam glass tile comprising a closed pore outer skin on at least one side, having an average pore size of 1.0 mm or less, a weight of 10 lbs. or greater, and compression strength of 6000 lb./sq. in. or greater. The foam glass tiles are very strong, and have a compression strength of 6000 psi (lb./sq. in.) or greater, and more particularly of 8000 lb./sq. in. or greater, and even more particularly of 10,000 lb./sq. in. or greater, and even more particularly of 12,000 lb./sq. in. or greater, and even more particularly of 14,000 lb./sq. in. or greater. These foam glass tiles will absorb more energy from an explosion, withstand higher wind loading and other mechanical forces. The closed pore outer skin may either be formed naturally or by bonding one or more secondary glass surfaces. The closed pore outer skin may have various color and texture variations which will make the tile suitable for use as an exterior or interior facade of a building or other structure. The tiles of the present invention may have an average pore size of 1.0 mm or less, and preferably 0.7 mm or less, and more preferably 0.6 mm or less, and even more preferably 0.5 mm or less, and even more preferably 0.4 mm or less, and even more preferably 0.3 mm or less. The density of the foam glass tile of the present invention is increased from the commercially recommended density of 9.5 lb./cu. ft. to have a higher density of between 30-100 lb./cu. ft., and more particularly greater than 40 lb./cu. ft., and even more particularly greater than 50 lb./cu. ft., and even more particularly greater than 60 lb./cu. ft. While the density of the foam glass tile of the present invention is preferably less than 100 lbs./cu. ft., in another embodiment of the present invention the density of the foam glass tile may be over 100 lbs./cu. ft. The weight of the foam glass tile of the present invention is greater than 10 lbs., and more particularly is greater than 30 lbs., and even more particularly 35 lbs. or greater, and even more particularly 40 lbs. or greater, and even more particularly 50 lbs. or greater, and even more particularly 65 lbs. or greater, and even more particularly 100 lbs. or greater.

Another embodiment of the present invention is a foam glass tile having an average pore size of 0.5 mm or less, a density of 30 lb./cu. ft. or greater and a compression strength 12,500 lb./sq. in. or greater. The foam glass tiles are very strong, and have a compression strength of 12,500 lb./sq. in. or greater, and even more particularly of 14,000 lb./sq. in. or greater. These foam glass tiles will absorb more energy from an explosion, withstand higher wind loading and other mechanical forces. While the foam glass tile is preferably a closed pore structure, it is not necessary. The tiles of the present invention may have an average pore size of 0.5 mm or less, and even more preferably 0.4 mm or less, and even more preferably 0.3 mm or less. The density of the foam glass tile of the present invention is increased from the commercially recommended density of 9.5 lb./cu. ft. to have a higher density of between 30-100 lb./cu. ft., and more particularly greater than 40 lb./cu. ft., and even more particularly greater than 50 lb./cu. ft., and even more particularly greater than 60 lb./cu. ft. While the density of the foam glass tile of the present invention is preferably less than 100 lb./cu. ft., in another embodiment of the present invention the density of the foam glass tile may be over 100 lb./cu. ft. The weight of the foam glass tile of the present invention is greater than 30 lbs., and more particularly 35 lbs. or greater, and even more particularly 40 lbs. or greater, and even more particularly 50 lbs. or greater, and even more particularly 65 lbs. or greater, and even more particularly 100 lbs. or greater.

An even further embodiment of the present invention is a foam glass panel comprised of one or more strong, high density foam glass tiles which can be assembled into a lightweight building facade. Particularly, the closed pore structure is textured for architectural appeal, the tile has an interior portion and the tile outer skin includes an additive to make its surface appear a different color than the interior portion of the tile. More particularly, such panels can be used to make a building more resistant to earthquake damage, wind and heat loading, and other environmental factors than buildings made from conventional concrete panels.

DETAILED DESCRIPTION OF THE INVENTION

The present invention relates to strong, high density foam glass tiles having a small pore size which can be used as building materials. The present invention may be used on the critical surfaces of buildings at high risk for terrorist attacks, in combination with cement, steel or other building materials. The present invention may also be used on surfaces of typical buildings. The present invention has the advantages of being more resistant to earthquakes and/or wind and heat loading. The present invention may also be used as structural support members of a building.

Under one embodiment of the present invention, the strong, high density foam glass tiles having small pore sizes are capable of absorbing more energy from an explosion than contemporary cement building materials, as well as withstand higher wind and heat loads and other mechanical abuse. Such strong, high density foam glass tiles may be fabricated in a variety of shapes, including but not limited to flat and/or curved shapes. Further, the strong, high density foam glass tiles of the present invention are made from siliceous materials and gas forming foaming agents, including but not limited to carbonaceous organics (e.g., sugar and starch), carbon black, silicon carbide, carbonates and sulfates. There are many possible methods to fabricate ceramic foam panels with various densities, sizes, and surface finishes. U.S. Pat. No. 4,430,108 describes various foam glass products fabricated from fly ash and other additives with various densities, and surface finishes, the disclosure of which is incorporated by reference herein. Similarly, U.S. Pat. No. 6,964,809 B2 owned by the same assignee also discloses additional processes useful in manufacturing the present invention, the disclosure of which is incorporated by reference herein. Foam glass with various densities can be fabricated by varying the composition and type and concentration of cellulating agents. Viscosity of glass is the dominating parameter during the foaming process. In addition, the pore structure and its uniformity are dependent on the distribution and particle size of the cellulating agent.

In another embodiment of the present invention, the foam glass tile is of a higher density and smaller pore size than traditional foam glass tiles. In particular, the foam glass tiles of this embodiment have a density increased from the commercially recommended density of 9.5 lb./cu. ft. to have a higher density of between 30-100 lb./cu. ft., and more particularly greater than 40 lb./cu. ft., and even more particularly greater than 50 lb./cu. ft., and even more particularly greater than 60 lb./cu. ft. While the density of the foam glass tile of this embodiment of the present invention is preferably less than 100 lb./cu. ft., in another embodiment of the present invention the density of the foam glass tile may be over 100 lb./cu. ft. Further, as shown in Examples 3-9, the preferred foam glass tiles have an average pore size of 1.0 mm or less, and preferably 0.7 mm or less, and more preferably 0.6 mm or less, and even more preferably 0.5 mm or less, and even more preferably 0.4 mm or less, and even more preferably 0.3 mm or less.

This high density and small pore size make a very strong foam glass tile. The foam glass tiles are very strong, and have a compression strength superior to typical cement which has a compression strength of around 4000 lb./sq. in. In particular, as demonstrated in the Examples 3-9, the foam glass tiles of the present invention have a compression strength of 6000 lb./sq. in. or greater, and more particularly of 8000 lb./sq. in. or greater, and even more particularly of 10,000 lb./sq. in. or greater, and even more particularly of 12,000 lb./sq. in. or greater, and even more particularly of 14,000 lb./sq. in. or greater. These foam glass tiles will absorb more energy from an explosion, withstand higher wind and heat loading and other mechanical forces.

This high density and small pore size foam glass tile also have a strong tensile strength. Similarly, as demonstrated by Examples 3-9, the foam glass tiles have a tensile strength greater than 500 lb./sq. in, and more particularly greater than 900 lb./sq. in., and even more particularly over 1200 lb./sq. in., and even more particularly 1400 lb./sq. in., and even more particularly over 2500 lb./sq. in.

In another embodiment of the present invention, the preferred foam glass tiles have a surface area of at least 1 ft×1 ft, and more particularly of at least 2 ft.×2 ft. and even more particularly at least 4 ft.×4 ft. in dimensions, and a depth of at least 2 in., and more preferably at least 3 in. and even more preferably at least 4 in. Such large tiles are advantageous over conventional smaller tiles because the larger size allows the composite of tiles to have less seams than composites of smaller tiles conventionally used. Such seams can be detrimental to the structural integrity since seams in a tile surface weaken due to thermal expansion and contraction, and thus tend to crack. These seams are also a means by which water can penetrate behind the tiles, resulting in damage from a variety of processes, such as molds, insects, and the freeze-thaw cycle. In the freeze-thaw cycle, when water seeps into a tile and freezes it expands. When the water thaws, it contracts thereby causing the material to crack. When subjected to a shock wave caused by an explosion, an improperly sealed seam will allow the wave to penetrate behind the tiles, causing them to explode outward rather than absorbing the desired energy. Thus, by reducing the number of seams, the risk of having improperly sealed seams will be reduced. The larger tile surface also has the further advantage of reducing labor at the labor site, by requiring less pieces to be assembled, which in turn reduces labor costs.

In another embodiment of the present invention, the foam glass tile preferably has a closed pore outer skin, which thus provides the tile with increased strength and protects the tile against water, and the freeze, thaw cycle. The closed pore outer skin may either be formed naturally as taught in U.S. Pat. No. 4,430,108 or mechanically by bonding a secondary glass surface as taught in U.S. Pat. No. 5,069,960, the contents of which are incorporated by reference herein. Alternatively, the closed pore outer skin may be formed in accordance to the teachings of U.S. Pat. No. 4,833,015, the contents of which are incorporated by reference herein. Natural formation is advantageous because it does not require additional labor and quality control, and thus is more cost effective and less burdensome. Using a secondary glass surface may also be advantageous because such techniques allow the closed pore outer skin to have various color and texture variations which will make the tile architecturally attractive for use as an exterior or interior facade of a building or other structure. One way of making different color surfaces is by the use of different color additives, as is generally well known to those skilled in the art.

Another advantage of the high density foam glass tile of the present invention is that when it is exposed to a blast shock wave it is capable of absorbing a substantial portion of the shock wave. Because these tiles are capable of absorbing a substantial portion of a blast shock wave, they are particularly advantageous as building construction materials for interior and exterior surfaces of buildings which are at risk of exposure to explosions, such as government buildings, embassies and high visibility/famous buildings.

The foam glass tiles of the present invention are also thicker than conventional foam glass tiles. In particular, the foam glass tiles of the present invention are at least 2 in. thick, and are preferably at least 3 in. thick, and even more preferably at least 4 in. thick. The increased thickness of the tile adds to the volume and therefore, to the weight of the tile. The increased thickness gives the tile an increased stiffness, which reduces inadvertent fractures during handling, whether from manufacturing, transporting or building. The increased thickness will also permit the tiles to absorb more energy from explosions, exposures to earthquakes, heat and winding loading, and/or other shock waves.

The selection of the particular size, thickness and density depends upon the use to which the tile is intended to be made. For example, if the tile is intended to be used to resist earthquakes, then the tiles should be optimized to be the lowest weight that can withstand the wind pressure. By contrast, if the tile is intended to protect a building or structure from shock waves associated with an explosion, then the tile should be optimized to increase its density and decrease its pore size to be strong enough to absorb such a shock wave. The desired thickness will depend upon the proximity of the exposed tile to the location of the potential explosion. For example, on the outside of a building, the thickness would have to take into account the distance of the tile to the nearest location where an automobile or truck with explosives may be parked. On the other hand, in an interior of a building, such as a support column, the proximity anticipated could be immediately next to such a column, although the likely anticipated explosive load would be substantially less.

For the purposes of resisting shock waves associated with an explosion, the tile of the present invention can be combined with a rigid backing to form a composite panel.

In the case of a tile to be used to make a structure resistant to earthquakes, a slighter lighter tile may be used with a rigid structure. The load caused by wind pressure which needs to be resisted by these tiles is related to the area between support columns. Thus, the greater the area between support columns, the more resistance and greater strength will be required from the composite tile with rigid structure. The thickness/density of the tiles to be used are accordingly defined by these parameters. Thus, selection of these properties should be optimized to provide the lightest system that can withstand the largest anticipated wind pressure sought to be resisted with an appropriate safety factor built in as is typically done in the construction industry. The tiles should be supported by a metal frame, which in turn is supported by structural metal supports of the building or other structure.

For aesthetic purposes, the tiles with a finished layer can be used on any surface subject to public view. Thus, if only one surface will be exposed to public view, than only that surface needs to have the tiles with a finished layer. On the other hand, if both sides of a wall sought to be protected by the present invention are subject to a public view, than a second tile with an appropriate finished layer can be used on the second exposed side, such as the interior of the building. Alternatively, other interior surfaces can also be used.

Another advantage of the tiles of the present invention is that such tiles are also heat insulating as well as fire proof. Thus, these tiles have an added advantage of being able to be used to protect a support column from a terrorist fire attack such as a Moltov cocktail, or other sources of fire. The use of the tiles of the present invention can thereby either prevent and/or delay the destruction of such support columns, thereby increasing the likelihood that occupants of an attacked building will have sufficient time to evacuate.

Another embodiment of the tiles of the present invention can be used to retrofit existing buildings or other structures. In particular, the tiles can be mounted on the potentially exposed walls. If such walls are already sufficiently rigid, then the tiles can be mounted directly thereon. If not, then the tiles can be mounted on an appropriate rigid structure or backing protective layer to form a panel, which in turn can be mounted on the exposed wall. Appropriate backing protective layer may be a fibrous composite, where such fibers are made of high tensile strength materials, such as graphite, Kelvar and/or fibreglass, or cementaceous materials, which may contain portland cement, reinforced portland cement, lime, aluminous cement, plaster, polymeric material, reinforced concrete. Such backing layer may be reinforced by metal, Kevlar or other supporting materials. A bonding promoter or adhesive, such as Elmer's pro bond concrete bonder adhesive-promoter, may be applied between the at least one foam glass layer and the backing layer. The composite may also have hanging hardware provided therein, and may be mounted in a load-bearing frame, and thus be capable of absorbing a substantial amount of shock waves and vibration energy.

In the preferred embodiment, the tile of the present invention can be manufactured using raw materials which include (but are not necessarily limited to) silica, fly ash, volcanic ash, diatomaceous earth, siliceous minerals, alkali carbonates, calcium and magnesium minerals such as dolomite, and gypsum, sodium silicate, borax, glass powders (such as cullet) and foaming agents. The foaming agent can be selected from carbonaceous organics such as sugar and starch, carbon black, silicon carbide, carbonates, sulfates and other like materials.

In an alternative embodiment of the present invention, the foam glass tiles may be reinforced by using a metal netting, metal wires or alternative support structures as described in U.S. Pat. Nos. 4,798,758, 4,833,015, 4,987,028, and 4,992,321, the contents of which are incorporated herein by reference. While on the one hand, these additional materials may help strengthen the resulting foam glass tile, on the other hand, they also can make it more difficult to cut.

To make the tile of the present invention, various methods can be used. In one embodiment, the starting raw materials to make the tile are blended together with water to form a homogeneous slurry. It must be noted that even though the preferred method of mixing is wet, nonetheless, dry blending may be selected depending on type of raw materials used in foam glass formulation. For instance, when glass powders (soda-lime glass cullet) is used as major raw material, the gasifier can be dry blended in a conventional mixer, such as a ball mill. When wet blending is used, the solid content of the slurry is preferably between 30-80 wt %, and more preferably between 50-70 wt %.

The slurry is then dried in a conventional dryer such as a spray dryer to produce dry powders. If a static dryer is used, then the dried aggregates are ground to form dried powders. The resulting powdery product is then calcined to a temperature at which the viscosity of the resulting foam glass is preferably between $10^7$ to $10^2$ poise, more preferably between $10^5$ to $10^3$ poise. Calcination may be carried out in a reducing environment to effectively pyrolyze organic gasifiers to microscopic carbon containing compounds. In the case of silicon carbide as foaming agent, calcination may be carried out in a neutral air atmosphere. When glass powders are used as major ingredients in the foam glass formulations, calcination step is the same as the foaming step. Calcination can be carried out in a rotary kiln, in stationary molds in a kiln, or in a fluidized bed reactor heated primarily by a hot gas.

The calcined product may require pulverization if calcination for instance is carried out in stationary molds. Calcination by fluidization may not require pulverization, if particles do not agglomerates in the fluidized bed. The calcined powders are screened preferably through 100 mesh screen, more preferably through 200 mesh screen to remove the coarse particles.

The powders are then molded into desired shapes, in a metal mold. The preferred metals are stainless steel and chromium containing alloys such as Inconel™ Inco Alloys. Inconel™ type alloys are preferred, since they can resist thermal cycles, and oxidation better than stainless steels. Mold release agents are preferably used to ease the de-molding process, and also minimize adhesion of the foam glass to the metal which can cause unwanted cracking in the finished foam glass product. The mold releasers should withstand the peak firing temperature, as a result inexpensive refractory oxides such as high silica minerals, high alumina mineral powders such as diatomaceous earth, silica, and various clays can be used. Secondary oxide glazing or surface coating can be applied over the molded foam glass powder precursor, to produce additional surface effect in the finish foam product.

The molds are then transferred into either electric or gas fired kilns that can accommodate the molds with a temperature uniformity better that 50° C. across any dimension of the mold, more preferably better than 20° C. The heating rate is selected based on the foam glass thickness, and product loading inside the kiln. Normally the heating rate may fall between 2-10° C./min., and preferredly between 3-5° C./min. At the peak foaming temperature the foam glass viscosity is between $10^5$ to $10^3$ poise. The soak time at the peak firing temperature depends on the foam glass dimensions. The soak time also effects the surface glazing thickness. Longer soak time results in the formulation of thicker surface glaze or skin. The larger foams may require longer soak times to ensure temperature equilibration throughout the foam body.

During cooling cycle to room temperature, thermal stresses across the foam glass need to be minimized to ensure a strong product free of residual thermal stresses. As a result the cooling rate around the annealing and strain point temperatures which correspond to an approximate viscosity range of $10^{12}$ to $10^{16}$ will be relatively slow, between 1-5° C./min, preferably between 1-3° C./min. Above and below this temperature range, depending on the foam dimensions, the average cooling rate is from 2-10° C. min., preferably 3-5° C./min.

The annealed foam glass will be de-molded, and trimmed on its sides if needed. Trimming can be done by various means such as grinding and cutting. Cutting with an abrasive resistant blade such as carbide blade is preferred, since it produces less dust than grinding. It should be noted that the foam glass dust is primarily composed of non-crystalline silica, which is much less harmful than crystalline silica dust, such as concrete dust.

The foam glass board produced can be used as a stand alone tile, or be used in fabrication of foam glass composite panels. All the trimming and dust collected during the final step will be ground and added to the starting raw materials. In addition, any product reject, such as broken tiles or panels will be ground and recycled back into the starting raw materials.

It will be understood by those skilled in the art that the foregoing method of making the tiles of the present invention could be modified or other methods of fabrication can be used without departing from the spirit and scope of the invention.

As discussed above, an aspect of the present invention is the inclusion of backing materials to the foam glass tile. Examples 1 and 2, below illustrate the application of portland cement as backing material. These examples demonstrate that pozzolanic bonding occur naturally at the interface of the foam glass tile and the cement containing backing layer.

Alternatively, other inorganic cementaceous backing materials can be applied over the foam glass tile to a desired thickness, preferably initially as a paste which will harden to a solid backing. The backing can be made into a multilayer structure, where lime or portland cement will be the adjacent layer to the foam to develop pozzolanic bond, followed by other cementaceous over layers. The cement backing materials can be reinforced by addition of fibers of glass, graphite, ceramics, polymers such as cellulose, metals, Kevlar or alike.

It is also possible to join the foam glass tile with other solid layers via a joining compound. For instance, appropriate contact adhesives can be applied between a sheet of metal and foam glass. One such adhesive that can be used with aluminum sheets is a silicone based adhesive. Other examples are application of a polymeric foam between the foam glass and another backing material to protect the polymeric foam. Polyurethane foam and cement board are examples of this type of multilayer backing. The advantage of polyurethane foam is that, it can be applied in place into a gap between a pre-positioned foam glass board and a sheathing back layer. Polymeric backing are particularly useful to reduce fragmentation of the brittle layers such as foam glass and more so of the cementaceous layers. The backing layer may contain multiple layers of foam glass bonded together with cement, polymeric foams or other contact adhesives.

The foam glass backing may be selected to have different density than the main foam glass panel for maximum absorption of shock wave energy. The front face of the foam glass layer normally is glazed as discussed before. However, a surface finish may be applied according to the present invention to impart additional protection and aesthetic appearance to the composite foam glass structure. The surface finish can be applied before or after the backing layers are installed. The finish can be a textured cementaceous and/or polymeric overlayer to display for instance a brick facing or marble type appearances. These finishes can be molded in place over the foam layer or be adhered to the foam as a separate sheathing via a contact adhesive or a cement layer with pozzolanic activity. These finishes would impart additional architectural appeal to the foam glass composite structure. In addition, colorants can be used in surface finishes to impart desired colors to the structure. Fibrous materials can be added to the surface finishes to impart additional reinforcement and to reduce fragmentation upon shock wave reception. Various UV protecting compounds can be added to the surface finishes if desired.

The thickness of both backing layers and the surface finishes can vary upon design specifications, required energy absorption and strength. The application of a surface finish may be unnecessary since the natural glazing of the foam glass panel as fired may be aesthetically sufficient.

EXAMPLE 1

A foam glass tile was made by blending the raw materials set forth in Table 1 below:

TABLE 1

| Fly ash (calcined type F) | 2000 g |
|---|---|
| Silica flour | 2000 g |
| Sodium Carbonate | 600 g |
| Sodium meta silicate, penta hydrate | 1600 g |
| Potassium carbonate | 0 |
| Borax | 0 |
| sugar | 120 g |
| Water | 1415 g |

The resulting slurry was dried, and the powder mixture was calcined at 950° C. for about 45 minutes to react the raw materials, and decompose sugar to finely, and evenly dispersed carbonaceous phase. The calcined product was ground to fine powders, placed in an Inconel™ mold, and was foamed by heating to about 850° C. and soaked at that temperature for approximately 30 minutes. The resulting foam glass was annealed to room temperature and demolded. The resulting foam glass had a density of about 25 lb./cu. ft., a dark greenish color, and a completely glazed surface. The pore structure was uniform with an average pore size of about 2 mm. After trimming the edges the tile had a dimension of approximately 16 in.×12 in.×3 in.

The foam glass-concrete composite tile according to the present invention was made by the following method. The foam was trimmed around its sides and was framed with strips of plywood around its perimeter with the glazed surface faced down, leaving a gap of about 1 in. above the tile to receive cement. A portland cement sand mix (Quickrete sand mix) was prepared according to the manufacturer instruction. The resulting paste placed over the exposed face of the foam which was in contact with the mold during firing, and was not trimmed to expose the cell structure before making the composite tile. The concrete was allowed to cure for about 28 hours, before being removed from the form. The interface between the foam and concrete layers were completely sealed indicating a strong cementaceous pozzolanic bond formation.

EXAMPLE 2

A foam glass tile was made by blending the raw materials set forth in Table 2 below:

TABLE 2

| Fly ash (calcined type F) | 2000 g |
|---|---|
| Silica flour | 2000 g |
| Sodium Carbonate | 320 g |
| Sodium meta silicate, penta hydrate | 800 g |
| Potassium carbonate | 320 g |
| Borax | 400 g |
| sugar | 120 g |
| Water | 1370 g |

The resulting slurry was dried, and the powder mixture was calcined at 900° C. for about 30 minutes to react the raw materials, and decompose sugar to finely, and evenly dispersed carbonaceous phase. The calcined product was ground to fine form powders, was placed in an Inconel™ mold, and was foamed by heating to about 860° C. with an average heating rate of about 3.5° C./min. The resulting foam was annealed to room temperature and de-molded. The foam glass had a density of about 52 lb./cu. ft., a greenish color, and a completely glazed surface. The pore structure was uniform with an average pore size of about 1-2 mm. After trimming the edges the tile had a dimension of approximately 17 in.×12 in.×1.4 in.

The foam glass-concrete composite tile according to the present invention was made by the following method. The foam was trimmed around its sides and was framed with strips of plywood around its perimeter with the glazed surface faced down, leaving a gap of about 1 inch above the tile to receive cement. A thin layer of Elmer's pro bond concrete bonder adhesive-promoter was applied to the foam. A portland cement mortar mix (Sakrete mortar mix) was prepared according to the manufacturer instruction. The resulting paste was placed over the exposed face of the framed foam glass tile and leveled. This was the face in contact with the firing mold, and was not trimmed to expose the cell structure before making the composite tile. The concrete was allowed to cure for about 28 hours, before being removed from the form. The interface between the foam and concrete layers were completely sealed indicating a strong cementaceous pozzolanic bond formation.

EXAMPLES 3-9

The foam glass tiles in Examples 3-9 were made by blending the raw materials set forth under Composition in Table 3 below:

In order to make a useful comparison, the weight of the composition was normalized assuming with the total amount of silica plus fly ash equal 100. Thereafter, to insure the proper amount of material is used the normalized composition weight is multiplied by an appropriate batch size factor, as indicated in Table 3, to account for the size of the mold being used. For example, a batch size factor of 50×, has been used for a mold 8 inches×14 inches×4 inches.

The resulting slurry was dried, and the powder mixture was calcined at a temperature between 900° C. and 1100° C., as indicated in the process section of Table 3, for between 5 to 60 minutes, as indicated in the process section of Table 3, to react the raw materials, and decompose sugar to finely, and evenly dispersed carbonaceous phase. The calcined product was ground to fine powders, placed in an Inconel™ mold, and was foamed by heating at a temperature between 750° C. to 900° C., as indicated in the process section of Table 3, and soaked at that temperature for between 10 to 60 minutes, as indicated in the process section of Table 3. The resulting foam glass was annealed to room temperature and de-molded.

The characteristics of the resulting foam glass for Examples 3 to 9 are indicated in the characteristics portion of Table 3. The resulting foam glass had a density of about 30 and 70 lb./cu. ft., as indicated in the characteristics section of Table 3, and a completely glazed surface. The pore structure was uniform with average pore sizes as indicated in the characteristics section of Table 3. As Table 3 shows, tiles with smaller pore sizes, high density and uniform structures provided have the greatest tensile and compression strength. In order to determine the strength of the samples of glass foam prepared, an effort was made to follow the standard ASTM testing procedures for concrete.

TABLE 3

| | Example | | | | | | |
|---|---|---|---|---|---|---|---|
| | 3 | 4 | 5 | 6 | 7 | 8 | 9 |
| Composition | | | | | | | |
| Silica sand (g) | 80 | 80 | 80 | 80 | 80 | 80 | 50 |
| Fly Ash (g) | 0 | 20 | 20 | 20 | 20 | 20 | 50 |
| $Fe_2O_3$ (g) | 3.4 | | | | | | |
| Sodium Silicate, 5 $H_2O$ (g) | 30 | 30 | 30 | 30 | 25 | 25 | 30 |
| Borax, 5 $H_2O$ (g) | 25 | 15 | 25 | 25 | 30 | 30 | 25 |
| Alumina (g) | 5 | | | | | | |
| Sugar (g) | 2 | 3 | 3 | 3 | 3 | 3 | 2 |
| Water (g) | 25 | 25 | 24 | 25 | 25 | 25 | 25 |
| Batch Size Factor | 20× | 20× | 60× | 40× | 50× | 50× | 20× |
| Process Information | | | | | | | |
| Calcination temp., ° C. | 970 | 970 | 970 | 970 | 970 | 970 | 970 |
| Calcination time, min. | 30 | 30 | 30 | 30 | 30 | 30 | 30 |
| Foaming temp., ° C. | 810 | 800 | 790 | 810 | 795 | 795 | 810 |
| Foaming time, min. | 10 | 10 | 10 | 10 | 10 | 10 | 10 |
| Foaming mesch size | 100 | 100 | 100 | 100 | 100 | 100 | 100 |
| Characteristics | | | | | | | |
| Density (PCF) | 32 | 36 | 41 | 46 | 62 | 65 | 69 |
| Bubbles/cm | 12 | 18 | 12 | 20 | 13 | 18 | 29 |
| Characteristic length (mm) | 0.8 | 0.6 | 0.8 | 0.5 | 0.8 | 0.6 | 0.3 |
| Bubble size | xx-big | big | x-big | big | big | med. | small |
| Compression strength (PSI) | 2078 | 2400 | 4300 | 6000 | 10500 | 12500 | 14600 |
| Tension strength (PSI) | 775 | 930 | | 960 | 1250 | 1400 | 2500 |
| Glazed Top Surface (closed pore outer skin) | Yes | Yes | Yes | Yes | Yes | Yes | Yes |

However, because the samples proved to be substantially stronger than concrete, the procedures had to be modified by reducing the size of the samples in order for the equipment used to actually break the samples. Thus, foam glass blocks were cut into cylinders between 1.0 and 1.5 inches in diameter and less than 5 inches tall for compression measurements without the glazed surface. As indicated in the characteristics portion of Table 3, the compression strength of Examples 7-9 were over 10,000 lb./sq. in., a factor of over 2½ times the compression strength of concrete (4,000 lb./sq. in.). Similarly, as indicated in the characteristics portion of Table 3, the tensile strength of Examples 7-9 were over 1250 lb./sq. in., a factor of over 2½ times the tensile strength of concrete (500 lb./sq. in.). Example 9 has a tensile strength of 2500 lb./sq. in., a factor of 5 times the tensile strength of concrete.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A foam glass tile having an average pore size of 0.5 mm or less, a density of 30 lb./cu. ft. or greater and a compression strength 12,500 lb./sq. in. or greater.

2. The foam glass tile according to claim 1, wherein said average pore size is 0.4 mm or less.

3. The foam glass tile according to claim 1, wherein said average pore size is 0.3 mm or less.

4. The foam glass tile according to claim 1, wherein said compression strength is 14,000 lb./sq. in. or greater.

5. The foam glass tile according to claim 1, wherein said tile has a tile surface area is at least 1 foot by 1 foot.

6. The foam glass tile according to claim 1, wherein said tile has a tile surface area is at least 2 feet by 2 feet.

7. The foam glass tile according to claim 1, wherein said tile has a tile surface area at least 4 feet by 4 feet.

8. The foam glass tile according to claim 1, wherein said density is 40 lb./cu. ft. or greater.

9. The foam glass tile according to claim 1, wherein said density is 50 lb./cu. ft. or greater.

10. The foam glass tile according to claim 1, wherein said density is 60 lb./cu. ft. or greater.

11. The foam glass tile according to claim 1, wherein said tile has a thickness of at least 2 inches.

12. The foam glass tile according to claim 1, wherein said tile has a thickness of at least 3 inches.

13. The foam glass tile according to claim 1, wherein said tile has a thickness of at least 4 inches.

14. The foam glass tile according to claim 1, wherein said tile has a weight of at least 20 lbs.

15. The foam glass tile according to claim 1, wherein said tile has a weight of at least 30 lbs.

16. The foam glass tile according to claim 1, wherein said tile has a weight of at least 35 lbs.

17. The foam glass tile according to claim 1, wherein said tile has a weight of at least 40 lbs.

18. The foam glass tile according to claim 1, wherein said tile has a weight of at least 50 lbs.

19. The foam glass tile according to claim 1, wherein said tile has a weight of at least 65 lbs.

20. The foam glass tile according to claim 1, wherein the tile has a weight of at least 100 lbs.

21. The foam glass tile according to claim 1, wherein the tile is assembled with at least one other tile of like construction to form a panel, said panel is used as a lightweight building facade.

22. The foam glass tile according to claim 21, wherein said building facade is assembled into at least a portion of a building so that said portion of said building will be substantially resistant to earthquake damage.

23. The foam glass tile according to claim 1, wherein said tile is assembled with at least one other tile of like construction to form a preassembled structure, said preassembled structure is a column, panel or a floor in a building structure.

24. The foam glass tile according to claim 1, wherein said tile has a closed pore structure.

25. The foam glass tile according to claim 24, wherein said outer skin is a glazed outer surface of said foam glass tile.

26. The foam glass tile according to claim 24, wherein said closed pore structure is textured for architectural appeal.

27. The foam glass tile according to claim 24, wherein said tile further comprises an interior portion and said tile outer skin comprises an additive to make its surface appear a different color than said interior portion of said tile.

28. A foam glass tile comprising a closed pore outer skin on at least one side, having an average pore size of 1.0 mm or less, a density of 50 lb./cu. ft. or greater and compression strength of 10,000 lb./sq. in. or greater.

29. The foam glass tile according to claim 28, wherein said average pore size is 0.7 mm or less.

30. The foam glass tile according to claim 28, wherein said average pore size is 0.6 mm or less.

31. The foam glass tile according to claim 28, wherein said average pore size is 0.5 mm or less.

32. The foam glass tile according to claim 28, wherein said average pore size is 0.4 mm or less.

33. The foam glass tile according to claim 28, wherein said average pore size is 0.3 mm or less.

34. The foam glass tile according to claim 28, wherein said compression strength is 12,000 lb./sq. in. or greater.

35. The foam glass tile according to claim 28, wherein said compression strength is 14,000 lb./sq. in. or greater.

36. The foam glass tile according to claim 28, wherein said tile has a tile surface area is at least 1 foot by 1 foot.

37. The foam glass tile according to claim 28, wherein said tile has a tile surface area is at least 2 feet by 2 feet.

38. The foam glass tile according to claim 28, wherein said tile has a tile surface area at least 4 feet by 4 feet.

39. The foam glass tile according to claim 28, wherein said density is 60 lb./cu. ft. or greater.

40. The foam glass tile according to claim 28, wherein said tile has a thickness of at least 2 inches.

41. The foam glass tile according to claim 28, wherein said tile has a thickness of at least 3 inches.

42. The foam glass tile according to claim 28, wherein said tile has a thickness of at least 4 inches.

43. The foam glass tile according to claim 28, wherein said tile has a weight of at least 30 lbs.

44. The foam glass tile according to claim 28, wherein said tile has a weight of at least 35 lbs.

45. The foam glass tile according to claim 28, wherein said tile has a weight of at least 40 lbs.

46. The foam glass tile according to claim 28, wherein said tile has a weight of at least 50 lbs.

47. The foam glass tile according to claim 28, wherein said tile has a weight of at least 65 lbs.

48. The foam glass tile according to claim 28, wherein said tile has a weight of at least 100 lbs.

49. The foam glass tile according to claim 28, wherein said tile is assembled with at least one other tile of like construction to form a panel, said panel is used as a lightweight building facade.

50. The foam glass tile according to claim 49, wherein said building facade is assembled into at least a portion of a building so that said portion of said building will be substantially resistant to earthquake damage.

51. The foam glass tile according to claim 28, wherein said outer skin is a glazed outer surface of said foam glass tile.

52. The foam glass tile according to claim 28, wherein said closed pore structure is textured for architectural appeal.

53. The foam glass tile according to claim 28, wherein said tile further comprises an interior portion and said tile outer skin comprises an additive to make its surface appear a different color than said interior portion of said tile.

* * * * *